United States Patent [19]
Onnenberg et al.

[11] Patent Number: 4,755,117
[45] Date of Patent: Jul. 5, 1988

[54] APPARATUS FOR THE PRODUCTION OF BACK-FOAMED CUSHIONS

[75] Inventors: Volker Onnenberg, Wiehl; Günter Möllmann, Hagen, both of Fed. Rep. of Germany

[73] Assignees: Fritsche-Mollmann GmbH & Co., Lotte; Bayer Aktiengesellschaft, Leverkusen, both of Fed. Rep. of Germany

[21] Appl. No.: 100,504

[22] Filed: Sep. 24, 1987

[30] Foreign Application Priority Data

Oct. 4, 1986 [DE] Fed. Rep. of Germany ....... 3633920

[51] Int. Cl.⁴ .............................................. B28B 1/58
[52] U.S. Cl. .................... 425/4 R; 425/112; 425/117; 425/126.1; 425/127
[58] Field of Search ............... 425/4 R, 112, 116, 117, 425/126 R, 127 R, 129 R, 200, 817 R

[56] References Cited

U.S. PATENT DOCUMENTS

| | | | |
|---|---|---|---|
| 3,484,510 | 12/1969 | Corazza | 425/4 R X |
| 3,712,771 | 1/1973 | White et al. | 425/126 R |
| 4,338,070 | 7/1982 | Nava | 425/129 R X |
| 4,360,329 | 11/1982 | Hayakeyama | 425/126 R X |

FOREIGN PATENT DOCUMENTS 2746686 4/1979 Fed. Rep. of Germany .

Primary Examiner—Charles Hart
Attorney, Agent, or Firm—Gene Harsh; Joseph C. Gil

[57] ABSTRACT

The present invention is directed to an apparatus for the production of back-foamed cushions from cover materials and foam, comprising:

(i) a mold comprising an upper mold half and a lower mold half, said lower mold half defining a cavity, the inside surface of which is capable of being covered by said cover material, (ii) a mix head associated with said mold, said mix head capable of introducing foam materials and/or reactants into said mold cavity, (iii) an upper ram provided above the lower mold half, and comprising several segments with contact pressure surfaces, which segments are mounted to be displaceable in guide bores of a supporting frame and wherein springs are associated with said segments, said springs acting on said segments in the direction of said mold cavity, and wherein when said upper ram is in the position of rest, the various contact pressure surfaces are located at different distances from the bottom of said mold cavity, and (iv) wherein said lower mold half is movable towards and away from said upper ram and/or said upper ram is movable towards and away from said lower mold half.

9 Claims, 1 Drawing Sheet

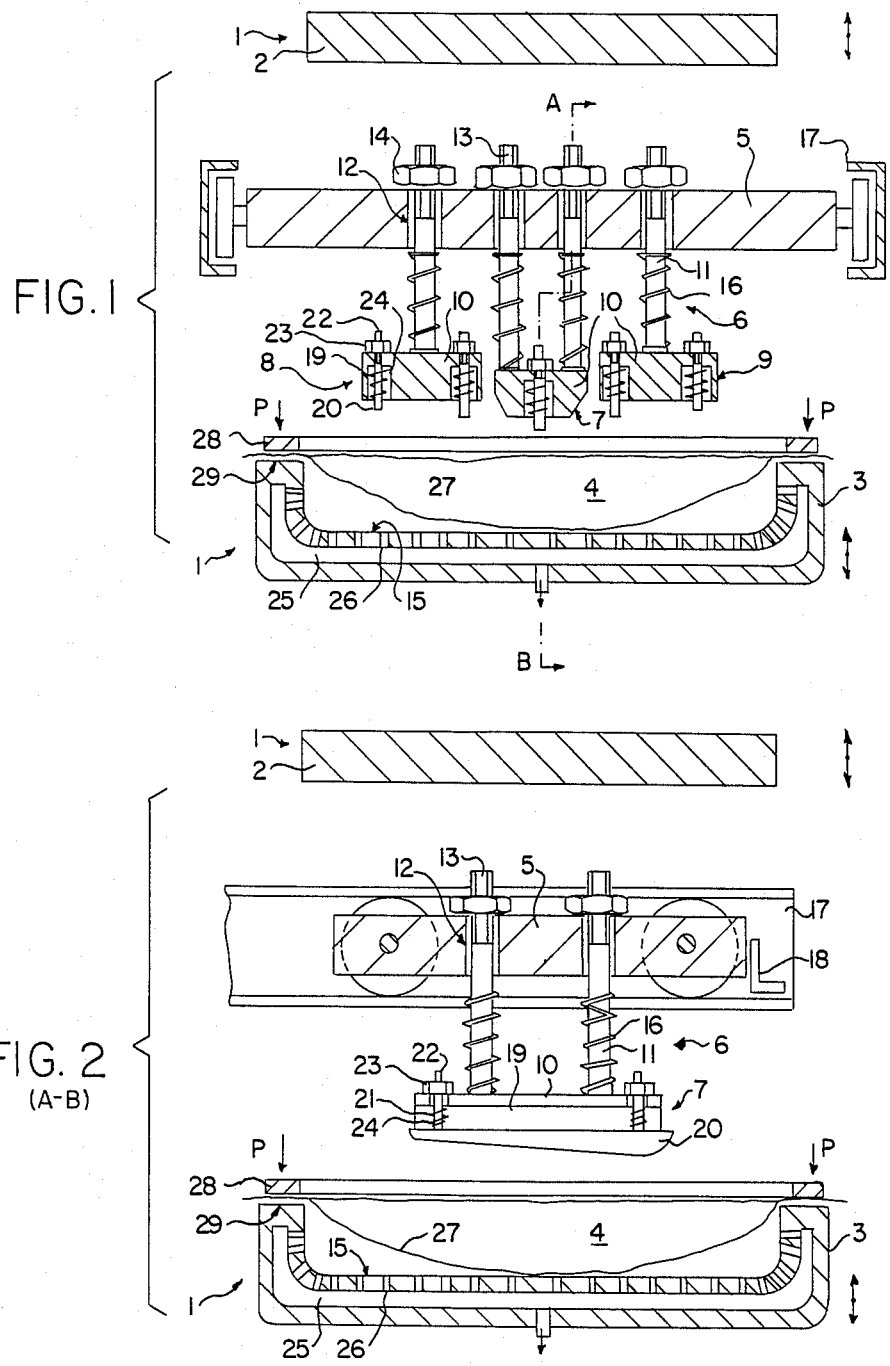

APPARATUS FOR THE PRODUCTION OF BACK-FOAMED CUSHIONS

BACKGROUND OF THE INVENTION

The present invention relates to an apparatus for the production of back-foamed cushions, in particular, for motor vehicle seats. The apparatus broadly comprises a mold with associated mixing head, in which an upper ram is provided above the lower mold half. Either or both of the lower mold half and the upper ram are movable towards each other.

It is known to push the piece of cover material into the mold cavity by means of an upper ram and/or a vacuum. If the bottom of the mold cavity is heavily contoured, the material may fail to make firm contact with the base of the cavity at every point. This is especially true if the cover material is not capable of stretching. This is liable to happen even if a vacuum is applied to the mold cavity to suck the material into contact with the mold cavity (DE OS No. 27 46 686) because the force of suction may be insufficient in areas with small radii (for example, at the base of projections at the bottom of the mold cavity). More powerful suction, however, would damage the cover material. At the same time, the piece of cover material must have the opportunity to move from a point, generally the center of the mold cavity, so that it can be stretched out. It is absolutely necessary to prevent the formation of unwanted folds or creases. The problem then arises of improving the apparatus mentioned above so that the piece of cover material will be smoothly placed against the wall of the mold at every point, and in particular at the bottom of the mold cavity, even when the interior surface of the mold is contoured with projections or ridges or the like.

BRIEF DESCRIPTION OF THE DRAWINGS

FIG. 1 is an end view of the apparatus, and

FIG. 2 represents a section through Line A–B of FIG. 1.

DESCRIPTION OF THE INVENTION

The above problem is solved by constructing the upper ram in the form of several segments each having contact pressure surfaces and being displaceably mounted in bores of a supporting frame and associated with compression springs urging them in the direction of the mold cavity. The segments are designed so that when the upper ram is in the position of rest the different contact pressure surfaces are placed at different distances from the bottom of the mold cavity. More particularly, the present invention is directed to an apparatus for the production of back-foamed cushions from cover materials and foam, comprising:

(i) a mold comprising an upper mold half and a lower mold half, said lower mold half defining a cavity, the inside surface of which is capable of being covered by said cover material, (ii) a mix head associated with said mold, said mix head capable of introducing foam materials and/or reactants into said mold cavity, (iii) an upper ram provided above the lower mold half, and comprising several segments with contact pressure surfaces, which segments are mounted to be displaceable in guide bores of a supporting frame and wherein springs are associated with said segments, said springs acting on said segments in the direction of said mold cavity, and wherein when said upper ram is in the position of rest, the various contact pressure surfaces are located at different distances from the bottom of said mold cavity, and (iv) wherein said lower mold half is movable towards and away from said upper ram and/or said upper ram is movable towards and away from said lower mold half.

By this arrangement, the piece of material for the cover is first pressed against the bottom of the mold cavity at a point or along a line by the contact pressure surface of a first segment. A second pressure surface then comes into action after a certain time lapse which may be so short that the two operations partly coincide or so long that one operation follows the other but in either case leaves sufficient time to enable the cover material to move snugly into contact with the bottom of the mold cavity in the region between these two clamping points or lines. This procedure is repeated until all the other contact pressure surfaces are also in their operating position.

The contact pressure surfaces may thus be formed as points or lines but they should not be wide enough to enable folds to be formed underneath them. The choice of width of these surfaces depends mainly on the nature of the material to be used for the cover and on the geometry of the mold cavity. The contact pressure surfaces may be so designed that, starting from a first clamping point, they progressively produce their clamping action over their whole length. The material for the cover can flow into place by following the action of these surfaces.

The distance of the individual contact pressure surfaces of the segments from the bottom of the mold cavity in the position of rest of the upper ram is preferably adjustable. This enables the points in time of the onset of the clamping action of the individual pressure surfaces to be adjusted with respect to one another.

According to another particular embodiment, the various compression springs associated with the individual segments vary in their spring force. It is thereby possible deliberately to exert a harder or softer clamping action at different points.

It is particularly advantageous to provide contact pressure surfaces in the form of clamping rails spring mounted on the segments. The clamping process is then carried out in two stages. The spring mounted clamping rails first exert a relatively weak clamping action corresponding to the force of the spring. When the excursion of the spring has been exhausted, then the segments are moved against the force of the compression springs acting on them, the clamping action being thereby increased. It is immaterial in principle whether the upper ram is moved towards the bottom of the mold cavity or the lower mold half is moved towards the upper ram.

According to another particular embodiment, the clamping rails decrease in height from one end to the other when the upper ram is in the position of rest. This means that at the moment when the rail first touches the bottom of the mold cavity, its contact pressure edge encloses an angle with the bottom of the cavity. The same result may, of course, also be achieved by supporting one end of the clamping rail by a longer spring or by placing the counter bearings of the springs at different levels.

In all these embodiments, the effect is achieved that, starting from the first clamping point, the material for the cover can progressively adapt itself to the contour of the bottom of the mold cavity in the direction of the clamping action.

In order that the contact pressure surfaces (clamping rails) may firmly grip the material when they descend to clamp it, they are preferably covered with an elastic lining. A polyurethane elastomer, for example, is suitable for this purpose.

If projections are formed at the bottom of the mold, it is particularly advantageous in view of the small radii of transition if the contact pressure surface of each clamping rail is formed by at least one helical spring. The helical spring may rotate about its own axis. There is thus always some air enclosed between the turns of the spring. This has a particularly advantageous effect on the capacity of the material for the cover to slide under the helical spring. Helical springs are particularly suitable as contact pressure elements, for example, in the form of holding down elements or rams. The latter may be used, for example, for moving the material for the cover into the corners of the mold cavity.

According to one particular embodiment, the supporting frame together with the upper ram can be removed from the range of vertical projection of the mold cavity.

For this purpose, the supporting frame is advantageously mounted in rails and can be displaced as soon as the portion of material for the cover has been correctly positioned and the upper ram no longer moves inside the mold cavity. The displaceable supporting frame should, of course, be fixed when it is in position above the mold cavity so that it will not be accidentally displaced. When the supporting frame together with the upper ram has been displaced from the region of the mold cavity, a mix head may be pivoted over the mold cavity for the application of a polyurethane reaction mixture to the back of the piece of material for the cover. After this operation, the mix head is again swung away and the two halves of the mold are brought together. The completed article of upholstery can be removed from the mold when the foam has hardened and the mold has been opened. It may be necessary to cut off excess material from the cover.

An exemplary embodiment of the new apparatus is represented purely diagrammatically in the drawing and explained below.

The apparatus shown in FIGS. 1 and 2 consists basically of a mold 1 comprising the upper mold half 2 and the lower mold half 3 which contains the mold cavity 4, an upper ram 6 is mounted on a supporting frame 5. A mixing head (not shown) can be swung into position above the mold cavity 4 for the introduction of e.g., a polyurethane reaction mixture forming a flexible foam. The upper ram 6 is composed of individual segments 7, 8, 9. Segments 8 and 9 are mirror images of one another and placed on either side of segment 7. Each of the segments 7, 8, and 9 consist of a base plate 10 which is mounted to be vertically displaceable in supporting bores 12 of the supporting frame 5 by means of guide pins 11. The guide pins 11 have threaded ends 13 on which adjustable stop nuts 14 are arranged. These nuts can be used to adjust the distances of the segments 7, 8, 9 from the bottom 15 of the mold cavity 4 when the upper ram 6 is in the inoperative position. This is important in determining the moment of onset of the operation of segments 7, 8, and 9. Segment 7 is placed at the least distance from the bottom 15 of the mold cavity 4. Segments 7, 8, and 9 bear against the supporting frame 5 by the springs 16 surrounding the guide pins 11. The supporting frame 5 is displaceably mounted in rails 17. A stop 18 serves to position and fix the supporting frame 5 over the mold cavity 4. Clamping rails serving as contact pressure surfaces 20 are arranged in recesses 19 in the segments 7, 8, 9. These clamping rails also have guide pins 21 which carry stop nuts 23 on their threaded ends 22. The clamping rails 20 bear against the base plate 10 by springs 24 inside the recesses 19. The clamping rails 20 of segments 8 and 9 situated nearer to the center of the upper ram 6 are closer to the bottom 15 of the mold cavity 4 than the outer clamping rails of these segments. Furthermore, the springs 24 associated with the inner clamping rails 20 are more rigid than those associated with the outer clamping rails 20. The lower mold half 3 has a vacuum chamber 25 which communicates with the mold cavity 4 by channels 26. This vacuum chamber 25 is connected to a vacuum reservoir (not shown). The lower mold half 2 is now raised so that the piece of material 27 for the cover can be placed in position in the mold cavity 4. The clamping rail 20 of segment 7 is the first to come into contact with the material 27. In fact, due to the slope of this clamping rail 20, it first makes contact at its right hand end (in FIG. 2) and then progressively over its whole length as far as the left hand end. At this stage of the working cycle, the speed of movement of the lower mold half 3 is regulated so that the piece of material 27 has sufficient time to position itself in contact with the bottom 15 of the mold cavity 4. After a brief interval of time, the inner clamping rails 20 of segments 8 and 9 make contact, and later also the outer rails. Finally, the clamping rails 20 completely compress the springs 24 and the subsequent pressure of the upwardly moving lower mold half 3 is transmitted to the segments 7, 8, and 9 which then press against the springs 16. Since these springs are more powerful than the springs 24, the material for the cover is completely fixed under the clamping rails 20.

When the material 27 for the cover has been placed in full contact with the wall of the mold cavity due to the vacuum applied to the mold cavity 4, the lower mold half 3 is moved down again so that the supporting frame 5 with the upper ram 6 attached thereto can be moved along the rails 17 to remove it from the range of vertical projection of the mold cavity 4. A polyurethane reaction mixture for forming a flexible foam is then applied from the mix head (not shown) to the back of the cover material 27, and the two mold halves 2, and 3 are brought together. When the reaction mixture has foamed up and the foam core has hardened, the mold 1 may be opened for removal of the finished upholstery product.

The new apparatus may, of course, also be used as part of a known foam molding plant (carousel or conveyer belt installation). These plants operate with separate stations for different stages of the process. The lower mold halves may be successively moved to the different stations or the stations may be successively placed over the fixed mold halves. The novel upper ram for positioning the material for the cover in the mold cavity would form part of such a station.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of back-foamed cushions from cover materials and foam, comprising:
   (i) a mold comprising an upper mold half and a lower mold half, said lower mold half defining a cavity, the inside surface of which is capable of being covered by said cover material,
   (ii) a mix head associated with said mold, said mix head capable of introducing foam materials and/or reactants into said mold cavity,
   (iii) an upper ram provided above the lower mold half, and comprising several segments with contact pressure surfaces, which segments are mounted to be displaceable in guide bores of a supporting frame and wherein springs are associated with said segments, said springs acting on said segments in the direction of said mold cavity, and wherein when said upper ram is in the position of rest, the various contact pressure surfaces are located at different distances from the bottom of said mold cavity, and
   (iv) wherein said lower mold half is movable towards and away from said upper ram and/or said upper ram is movable towards and away from said lower mold half.

2. An apparatus according to claim 1, characterized in that the distance of the individual segments and of their contact pressure surfaces from the bottom of the mold cavity when the upper ram is in the position of rest is adjustable.

3. An apparatus according to claim 1, characterized in that the springs associated with the various segments differ in their spring force.

4. An apparatus according to claim 1 characterized in that the contact pressure surfaces are formed by clamping rails spring mounted on the segments.

5. An apparatus according to claim 4, characterized in that the length of stroke of the clamping rails is adjustable.

6. An apparatus according to claim 5, characterized in that the clamping rails decrease in height from one end to the other when the upper ram is in the position of rest.

7. An apparatus according to claim 1, characterized in that the contact pressure surfaces have an elastic lining.

8. An apparatus according to claim 1, characterized in that the contact pressure surfaces have at least one spiral spring each at pressure edge.

9. An apparatus according to claim 1, characterized in that the supporting frame with the upper ram is removable from the range of vertical projection of the mold cavity.

* * * * *